United States Patent [19]

Saeki

[11] Patent Number: 4,529,751

[45] Date of Patent: Jul. 16, 1985

[54] RESIN COATED SAND FOR CASTING

[75] Inventor: Yukio Saeki, Fujieda, Japan

[73] Assignee: Sumitomo Durez Company, Ltd., Tokyo, Japan

[21] Appl. No.: 542,914

[22] Filed: Oct. 17, 1983

[30] Foreign Application Priority Data

Oct. 29, 1982 [JP] Japan ................. 57-189293

[51] Int. Cl.³ .............................................. C08K 5/06
[52] U.S. Cl. .................................. 523/145; 523/147; 428/404; 528/153; 528/155
[58] Field of Search ............... 523/145, 147; 528/137, 528/153, 155; 428/407, 404

[56] References Cited

U.S. PATENT DOCUMENTS

| | | | |
|---|---|---|---|
| 4,345,003 | 8/1982 | Matsushima et al. | 523/145 X |
| 4,358,570 | 11/1982 | Tobinaga | 523/143 X |
| 4,459,377 | 7/1984 | Saeki et al. | 523/145 |
| 4,460,717 | 7/1984 | Saeki et al. | 523/145 |

OTHER PUBLICATIONS

J. K. Stille, "Introduction to Polymer Chem.", John Wiley and Sons, Inc., N.Y., (1962), pp. 102–103.

*Primary Examiner*—Joseph L. Schofer
*Assistant Examiner*—Fred M. Teskin
*Attorney, Agent, or Firm*—J. F. Tao; J. F. Mudd

[57] ABSTRACT

A phenolic resin for application in foundry shell molding operations having improved properties is disclosed. The phenolic resin is prepared by reacting aldehydes and a mixture of bisphenol A and bisphenol F to prepare a phenolic resin for coating foundry aggregates or sand to prepare shell molds having low thermal expansion and improved shake out properties.

10 Claims, No Drawings

RESIN COATED SAND FOR CASTING

BACKGROUND OF THE INVENTION

This invention relates to an improved resin coated sand for use in shell-molding foundry operations, to eliminate the problems of thermal shock caused when hot metal is cast into the mold. In conventional sand molding operations, a mixture of sand coated with resin binder is placed in a mold, and the heat of the processing steps causes reactions between the binder components to improve the pressed strength of the sand and retain the configuration of the part to be cast.

Upon introduction of the molten metal into the mold, the temperature difference between the molten metal and the mold is great, and the heat of molten metal is transferred to the mold creating thermal shock in the mold, which may create cracks and fissures in the sand mold. The abrupt expansion caused by the temperature differential, destroys the binding action of conventional phenolic binders and cracks and rupture of the mold occur.

The effect of the heat of the molten metal upon the binder is advantageous, since this heat destroys the binder holding the sand or aggregate, and allows, upon cooling, the easy removal of the sand from the cast molded part. The sand is removed by tapping or flogging the molten part to remove the particles. This is known as the shake out property of the mold.

Therefore a resin mixture must be selected that will provide adequate thermal shock protection as well as allow simple removal of the binder-aggregate from the cast item.

A known method to solve the drawback for preventing the molds from cracks has been adopted by means of incorporating cushioning substances into phenolic resins or coated sand obtained therefrom. This method can make the molds flexible as well as free from stress at heating thereof. Said conventional cushioning substances are Vinsol thermoplastic resins, pletroleum resins, rosin, etc. While these substances play a role of cushioning effect in the molds to a certain extent, they have drawbacks in that they emit a disagreeable odor at pouring, due to a thermal decomposition or evaporation thereof. Also, the molds containing such materials are poor in the shake-out property.

After much investigation to overcome said drawbacks, the inventor has found that a shell mold can be made having improved properties and excellent shake out properties if a resin is formed by reacting an aldehyde and a composition containing bisphenol A and bisphenol F in a weight ratio of 98:2 to 80:20.

Bisphenol A is:

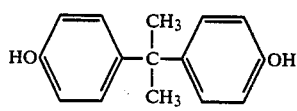

Bisphenol F is:

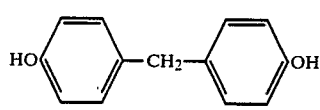

SUMMARY OF THE INVENTION

This invention is related to the foundry molding operations and a resin for the coating of foundry aggregates for mold preparations. The resin is a phenolic type resin wherein aldehydes are reacted with a mixture of bisphenol A and bisphenol F, and the ratio of bisphenol A to bisphenol F can vary from 98:2 to 80:20. The number average molecular weight of the resin will have a range of 300-1000. The resin is a solid, and is coated by conventional means on sand or foundry aggregates to produce a shell molding material which upon processing produces a shell mold which avoids cracking and shakes out easily.

DETAILED DESCRIPTION OF THE INVENTION

This invention relates to resin coated sand for casting, and particularly to resin coated sand for preventing the cracking of a mold when molten metal is poured thereinto.

The dry hot coating process is generally known as a method for preparing resin coated sand for use in the manufacture of molds. Resin coated sand or foundry aggregate is prepared by mixing a novolac type phenolic resin or a solid resol type phenolic resin into heated foundry sand. Hexamethylenetetramine is used as a curing agent for the novolac resin.

A novolac resin is obtained by employing 0.6 to 0.9 of an aldehyde per mol of a phenol, and reacting them in the presence of an acidic catalyst. The resol resin is obtained by employing 1 to 3 mols of an aldehyde per mol of a phenol, and reacting them in the presence of an alkaline catalyst. A mold made by using a phenolic resin as a binder is, however, likely to crack when the molten metal is poured therein. This is apparently due to the rapid thermal expansion of coated sand by the intense heat of the metal being poured. An attempt hitherto made to avoid such cracking has been to add a substance having a cushioning effect to a phenolic resin or coated sand to obtain a mold which is flexible, and has a low coefficient of thermal expansion.

Such substances as Vinsol thermoplastic resins, petroleum resins and rosin are used for the cushioning purposes. These materials lower the thermal expansibility of molds and are effective to some extent for preventing their cracking. They, however, have the disadvantage of emitting an objectionable odor due to thermal decomposition or volatilization during the pouring of molten metal, or producing a mold which is not easy to shake out.

The inventor of this invention has conducted research to overcome those drawbacks. As a result, it is possible to obtain a shell mold which does not crack, or produce any objectionable odor, and which is easy to shake out if the coated sand from which the mold is formed contains a resin which is obtained by reacting an aldehyde and a composition containing bisphenol A:

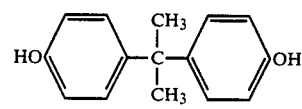

and bisphenol F:

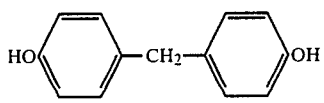

in a weight ratio of 98:2 to 80:20, and is solid at room temperatures. If the bisphenol A in the composition has a weight ratio which is higher than 98:2 to bisphenol F, the resulting mold fails to have a sufficiently low coefficient of thermal expansion, while a mold which is unsatisfactory in strength is obtained if the bisphenol A has a weight ratio which is lower than 80:20.

Phenol may be substituted for part of the bisphenol mixture and reacted with the aldehydes. If less than 20 parts by weight of bisphenol mixture is used with 100 parts by weight phenol, a resin will be obtained which when coated onto the foundry aggregate has a unsatisfactory low coefficient of thermal expansion.

The resin described in this invention has advantages over conventional phenolic resins as binders for sand molding operations etc. The isopropyl group in bisphenol A serves as a binder for coated sand and makes it flexible. Its flexibility is synergistically increased by the presence of bishenol F which is similar to bisphenol A in chemical structure, and is compatible with bisphenol A. This flexibility produces a cushioning effect which lowers the coefficient of thermal expansion of the mold.

The aldehyde used for the preparation of a normally solid resin used in this invention may be selected from among, for example, formaldehyde, paraformaldehyde, trioxane acetaldehyde, etc.

If a catalyst is required for the preparation of the resin used in this invention, one or more substances may be selected from among acidic substances such as oxalic acid, hydrochloric acid, sulfuric acid, phosphoric acid, p-toluenesulfonic acid, benzenesulfonic acid, maleic acid and formic acid, metal salts of organic acids, such as zinc acetate, magnesium acetate and calcium acetate, primary amines such as ammonia and ethylamine, secondary amines such as diethylamine, tertiary amines such as triethylamine and triethanolamine, alkali metal hydroxides such as sodium hydroxide and potassium hydroxide, and alkaline earth metal hydroxides such as calcium hydroxide and magnesium hydroxide.

According to this invention, it is advisable to use a resin having a number-average molecular weight of 300 to 1,000 and preferably, 350 to 750. If its number-average molecular weight is less than 300, the sand coated therewith fails to produce a mold which is satisfactorily resistant to cracking. If it exceeds 1,000, there is obtained a mold which is lower in strength.

The lubricant which the resin may contain according to this invention may be of any ordinary type, but is preferably selected from among ethylene-bis-stearamide, methylene-bis-stearamide, stearamide and methylol stearamide. The lubricant may be added at any stage before, during or after the reaction for the preparation of a normally solid resin.

The resin coated sand for casting according to this invention may be produced by any of the dry hot coating, semihot coating, cold coating and powder solvent processes, and the dry hot coating process is particularly preferable for this invention.

It is sufficient to incorporate a maximum of four parts by weight of the normally solid resin into 100 parts by weight of foundry sand. An increase in the proportion of the resin over four parts by weight does not cause any correspondingly greater improvement in the properties of the resulting resin coated sand or the mold formed therefrom, but merely adds to the cost of production.

The resin coated sand for casting according to this invention may contain any conventionally known curing promoter, or mold property improver (e.g., strength improver, shakeout property improver or rapid thermal expansion inhibitor) without decreasing the advantages of this invention.

The invention will now be described with reference to several examples which are not intended to limit the scope of this invention. In these examples and comparative examples, "parts" and "percent" represent "parts by weight" and "percent by weight", respectively.

PREPARATION EXAMPLE 1

A reaction vessel having a cooler and a stirrer was charged with 900 parts of bisphenol A, 100 parts of bisphenol F, 250 parts of 37% formalin and 10 parts of oxalic acid. The temperature of the mixture was gradually elevated until it reached 96° C., and after 150 minutes of a reflux at that temperature, 10 parts of methylene-bis-stearamide were added into the vessel. After the reaction mixture had been dispersed, it was subjected to vacuum dehydration to yield 970 parts of resin in solid form at ordinary room temperature.

PREPARATION EXAMPLE 2

A reaction vessel having a cooler and a stirrer was charged with 500 parts of phenol, 450 parts of bisphenol A, 50 parts of bisphenol F, 640 parts of 37% formalin and 10 parts of oxalic acid. The temperature of the mixture was gradually elevated until it reached 96° C., and after 180 minutes of reflux at the temperature, 10 parts of ethylene-bis-stearamide were added into the vessel. After the reaction mixture had been dispersed, it was subjected to vacuum dehydration to yield 1,080 parts of resin in solid form at ordinary room temperature.

PREPARATION EXAMPLE 3

A reaction vessel having a cooler and a stirrer was charged with 1,000 parts of crude bisphenol A "BPA-154" produced by Shell Chemical Co., Ltd. which contains bisphenol A and bisphenol F in a weight ratio of 97:3, 560 parts of 37% formalin and 100 parts of 28% aqueous ammonia. The temperature of the mixture was gradually elevated until it reached 96° C., and after 40 minutes of reflux at that temperature, 10 parts of methylene-bis-stearamide were added into the vessel. After the reaction mixture had been dispersed, it was subjected to vacuum dehydration to yield 1,060 parts of a resin in solid form at ordinary room temperature.

PREPARATION EXAMPLE 4

A reaction vessel having a cooler and a stirrer was charged with 1,000 parts of phenol, 650 parts of 37% formalin and 10 parts of oxalic acid. The temperature of the mixture was gradually elevated until it reached 96° C., and after 150 minutes of a reflux at that temperature, 10 parts of methylene-bis-stearamide were added into the vessel. After the reaction mixture had been mixed and dispersed, it was subjected to vacuum dehydration, and discharged from the vessel. There was obtained 970 parts of a novolac type phenolic resin.

PREPARATION EXAMPLE 5

A reaction vessel having a cooler and a stirrer was charged with 900 parts of bisphenol A, 100 parts of bisphenol F, 250 parts of 37% formalin and 10 parts of oxalic acid. The temperature of the mixture was gradually elevated until it reached 96° C., and after 30 minutes of reflux at that temperature, 10 parts of methylene-bis-stearamide were added into the vessel. After the reaction mixture had been dispersed, it was subjected to vacuum dehydration to yield 750 parts of resin in solid form at ordinary room temperature.

PREPARATION EXAMPLE 6

A reaction vessel having a cooler and a stirrer was charged with 900 parts of bisphenol A, 100 parts of bisphenol F, 420 parts of 37% formalin and 3 parts of oxalic acid. The temperature of the mixture was gradually elevated until it reached 96° C., and after 360 minutes of reflux at that temperature, 10 parts of methylene-bis-stearmide were added into the vessel. After the reaction mixture had been dispersed, it was subjected to vacuum dehydration to yield 980 parts of resin in solid form at ordinary room temperature.

PREPARATION EXAMPLE 7

A reaction vessel having a cooler and a stirrer was charged with 990 parts of bisphenol A, 10 parts of bisphenol F, 250 parts of 37% formalin and 10 parts of oxalic acid. The temperature of the mixture was gradually elevated until it reached 96° C., and after 150 minutes of reflux at that temperature, 10 parts of methylene-bis-stearamide were added into the vessel. After the reaction mixture had been dispersed, it was subjected to vacuum dehydration to yield 980 parts of a resin in a solid form at ordinary room temperature.

PREPARATION EXAMPLE 8

A reaction vessel having a cooler and a stirrer was charged with 700 parts of bisphenol A, 300 parts of bisphenol F, 250 parts of 37% formalin and 10 parts of oxalic acid. The temperature of the mixture was gradually elevated until it reached 96° C., and after 150 minutes of reflux at that temperature, 10 parts of methylene-bis-stearamide were added into the vessel. After the reaction mixture had been dispersed, it was subjected to vacuum dehydration to yeild 930 parts of resin in solid form at ordinary room temperature.

Table 1 shows the characteristics of the resins obtained in Preparation Examples 1 to 8:

TABLE 1

|  | Preparation Examples | | | | | | | |
| --- | --- | --- | --- | --- | --- | --- | --- | --- |
|  | 1 | 2 | 3 | 4 | 5 | 6 | 7 | 8 |
| Melting point (°C.) | 79 | 83 | 77 | 83 | 74 | 105 | 80 | 76 |
| Number-average molecular weight | 421 | 492 | 358 | 438 | 213 | 1153 | 447 | 357 |

EXAMPLE 1

A whirl mixer was charged with 7,000 parts of Sanei No. 6 silica sand which had been heated to a temperature of 130° C. to 140° C. Then, 140 parts of the resin obtained from Preparation EXAMPLE 1 were added into the mixer, and mulled with the sand for 40 seconds. A solution of 21 parts of hexamethylenetetramine in 105 parts of water was added into the mixer, and the mixture was mulled until the coated sand crumbled. Then, 7 parts of calcium stearate were added into the mixer, and after 30 seconds of mixing, the mixture was discharged and aerated to yield resin coated sand for casting.

EXAMPLE 2

Resin coated sand for casting was obtained by same procedure as described in Example 1, except that the resin obtained from Preparation Example 2 was substituted.

EXAMPLE 3

A whirl mixer was charged with 7,000 parts of Sanei No. 6 silica sand which had been heated to a temperature of 130° C. to 140° C. Then, 140 parts of the resin obtained from PREPARATION EXAMPLE 3 were added into the mixer, and mulled with the sand for 40 seconds. Then, 105 parts of cooling water was added into the mixer, and the mixture was mulled until coated sand crumbled. Then, 7 parts of calcium stearate were added into the mixer, and after 30 seconds of mixing, the mixture was discharged and aerated to yield resin coated sand for casting.

COMPARATIVE EXAMPLE 1

A whirl mixer was charged with 7,000 parts of Sanei No. 6 silica sand which had been heated to a temperature of 130° C. to 140° C. Then, 140 parts of the resin obtained from PREPARATION EXAMPLE 4 were added into the mixer, and mulled with the sand for 40 seconds. A solution of 21 parts of hexamethylenetetramine in 105 parts of water was added into the mixer, and the mixture was mulled until coated sand crumbled. Then, 7 parts of calcium stearate were added into the mixer, and after 30 seconds of mixing, the mixture was discharged and aerated to yield resin coated sand for casting.

COMPARATIVE EXAMPLE 2

Resin coated sand for casting was obtained by the same procedure as described in COMPARATIVE EXAMPLE 1 except that the resin obtained from PREPARATION EXAMPLE 5 was substituted.

COMPARATIVE EXAMPLE 3

Resin coated sand for casting was obtained by the same procedure as described in COMPARATIVE EXAMPLE 1, except that the resin obtained from PREPARATION EXAMPLE 6 was substituted.

COMPARATIVE EXAMPLE 4

Resin coated sand for casting was obtained by the same procedure as described in COMPARATIVE EXAMPLE 1, except that the resin obtained from PREPARATION EXAMPLE 7 was substituted.

COMPARATIVE EXAMPLE 5

Resin coated sand for casting was obtained by the same procedure as described in COMPARATIVE EXAMPLE 1, except that the resin obtained from PREPARATION EXAMPLE 8 was substituted.

TABLE 2 shows the characteristics of the various kinds of resin coated sand for casting obtained in EXAMPLES 1 to 3, and COMPARATIVE EXAMPLES 1 to 5, and the thermal expansion of the molds formed from those kinds of sand.

TABLE 2

|  | EXAMPLE | | | COMPARATIVE EXAMPLE | | | | |
| --- | --- | --- | --- | --- | --- | --- | --- | --- |
|  | 1 | 2 | 3 | 1 | 2 | 3 | 4 | 5 |
| Stick Point (°C.) | 95 | 98 | 93 | 98 | 92 | 108 | 96 | 92 |
| Bending strength (kg/cm$^2$) | 34.2 | 33.5 | 31.8 | 32.3 | 34.5 | 11.2 | 32.5 | 21.3 |
| Rapid thermal expansion (%) | 0.67 | 0.72 | 0.71 | 1.52 | 1.24 | 1.02 | 0.91 | 0.85 |

The following methods were employed for determining the various characteristics shown in Table 1 and 2:
Melting point: Method of JIS K-0064;
Number-average molecular weight: Vapor pressure equilibrium method;
Stick point: JACT Method C-1;
Bending strength: JACT Method SM-1;
Rapid thermal expansion: JACT Method SM-7 at 1,000° C.

I claim:

1. A resin coated sand for foundry molding operations comprising foundry aggregates coated with a resin prepared by reacting aldehydes and a composition containing bisphenol A and bisphenol F in a weight ratio of 98:2 to 80:20, wherein the resin has a number average molecular weight of 300–1000.

2. A resin coated sand according to claim 1, wherein the number average molecular weight is 350–750.

3. A resin coated sand according to claim 1 wherein a lubricant is added to the resin.

4. A resin coated sand according to claim 3, wherein a lubricant is added to the resin.

5. A resin coated sand for foundry molding operations comprising foundry aggregates coated with a resin prepared by reacting aldehydes with a composition containing phenol and bisphenol A-bisphenol F mixture, said bisphenol mixture containing a weight ratio of 98:2 to 80:20 bisphenol A to bisphenol F, and said bisphenol mixture is mixed with the phenol in a proportion of at least 20 parts by weight per 100 parts by weight phenol, wherein the resin has a number average molecular weight of 300–1000.

6. A resin coated sand according to claim 5, wherein the resin has a number average molecular weight of 350–700.

7. A resin coated sand according to claim 5, wherein a lubricant is added to the resin.

8. A resin coated sand according to claim 6, wherein a lubricant is added to the resin.

9. A resin coated sand for foundry molding operations comprising foundry aggregates coated with a resin prepared by reacting aldehydes with a composition containing bisphenol A and bisphenol F in a weight ratio of 98:2 to 80:20 and a lubricant; said resin having a number average molecular weight in the range 350–750.

10. A resin coated sand for foundry molding operations comprising foundry aggregates coated with a resin prepared by reacting aldehydes with a composition containing phenol and bisphenol A-bisphenol F mixture and lubricant; said bisphenol mixture composed of a weight ratio of 98:2 to 80:20; and said composition having the ratio of phenol to said bisphenol mixture of 100 parts by weight phenol to greater than 20 parts by weight bisphenol mixture, wherein the resin has a number average molecular weight of 300–1000.

\* \* \* \* \*